(12) United States Patent
Mikita et al.

(10) Patent No.: US 12,545,152 B2
(45) Date of Patent: Feb. 10, 2026

(54) VEHICLE SEAT

(71) Applicants: NHK SPRING CO., LTD., Yokohama (JP); SUBARU CORPORATION, Tokyo (JP)

(72) Inventors: Yukinori Mikita, Yokohama (JP); Kensuke Yoshiga, Yokohama (JP); Jun Shirai, Tokyo (JP); Fumito Kitanaka, Tokyo (JP); Masafumi Takano, Tokyo (JP)

(73) Assignees: NHK SPRING CO., LTD., Yokohama (JP); SUBARU CORPORATION, Tokyo (JP)

( * ) Notice: Subject to any disclaimer, the term of this patent is extended or adjusted under 35 U.S.C. 154(b) by 168 days.

(21) Appl. No.: 18/482,728

(22) Filed: Oct. 6, 2023

(65) Prior Publication Data

US 2024/0116408 A1 Apr. 11, 2024

(30) Foreign Application Priority Data

Oct. 11, 2022 (JP) .................................. 2022-163569

(51) Int. Cl.
*B60N 2/22* (2006.01)

(52) U.S. Cl.
CPC .................................. *B60N 2/2227* (2013.01)

(58) Field of Classification Search
CPC ..... B60N 2/433; B60N 2/2227; B60N 2/2218
See application file for complete search history.

(56) References Cited

U.S. PATENT DOCUMENTS

| 8,353,561 | B2* | 1/2013 | Yamazaki | B60N 2/90 297/452.38 |
| 9,216,667 | B1* | 12/2015 | Izawa | B60N 2/6009 |
| 10,940,781 | B1* | 3/2021 | Arico | B60N 2/433 |
| 2004/0090101 | A1* | 5/2004 | Andersson | B60N 2/433 297/378.12 |
| 2013/0187424 | A1* | 7/2013 | Pleskot | B60N 2/06 297/311 |
| 2015/0306983 | A1* | 10/2015 | Takei | B60N 2/167 297/183.9 |

(Continued)

FOREIGN PATENT DOCUMENTS

| DE | 3643195 A * | 6/1988 | ........... B60N 2/2227 |
| FR | 2795372 A1 * | 12/2000 | ........... B60N 2/4214 |

(Continued)

OTHER PUBLICATIONS

Office Action issued in Japanese Application No. 2022-163569, dated Dec. 16, 2025.

*Primary Examiner* — Joshua J Michener
(74) *Attorney, Agent, or Firm* — KNOBBE, MARTENS, OLSON & BEAR, LLP

(57) ABSTRACT

A vehicle seat includes a hinge cover and a reclining lever. The hinge cover is disposed at a side portion of a seat cushion, and has an opening through which a recliner shaft of a recliner provided between the seat cushion and a seat back passes. The reclining lever is disposed at an outer side in a seat width direction with respect to the hinge cover, is rotatable about the recliner shaft to unlock the recliner, and has a protrusion protruding inward in the seat width direction, the protrusion facing an edge portion of the opening in a radial direction of the recliner shaft.

4 Claims, 5 Drawing Sheets

(56) References Cited

U.S. PATENT DOCUMENTS

| | | | | |
|---|---|---|---|---|
| 2015/0306990 A1* | 10/2015 | Nakagawa | ............ | B60N 2/682 |
| | | | | 297/452.1 |
| 2016/0339809 A1* | 11/2016 | Wetzig | ................ | B60N 2/2356 |
| 2017/0028878 A1* | 2/2017 | Nakagawa | ............ | B60N 2/1615 |
| 2019/0092200 A1* | 3/2019 | Minegishi | ............... | B60N 2/682 |
| 2022/0234479 A1* | 7/2022 | Xiao | ..................... | B60N 2/235 |
| 2023/0150401 A1* | 5/2023 | Zang | .................. | B60N 2/2227 |
| | | | | 297/463.1 |

FOREIGN PATENT DOCUMENTS

| | | | | |
|---|---|---|---|---|
| FR | 2935313 A1 * | 3/2010 | .............. | B60N 2/16 |
| FR | 3042157 A1 * | 4/2017 | .............. | B60N 2/22 |
| JP | 2005132133 A * | 5/2005 | .............. | B60N 2/22 |
| JP | 2009166808 A * | 7/2009 | | |
| JP | 5170626 B2 * | 3/2013 | | |
| JP | 2015-065990 A | 4/2015 | | |
| JP | 2018127165 A * | 8/2018 | .............. | A47C 1/02 |
| JP | 6916232 B2 | 8/2021 | | |
| WO | WO-2016013564 A1 * | 1/2016 | .............. | B60N 2/16 |

* cited by examiner

VEHICLE SEAT

CROSS-REFERENCE TO RELATED APPLICATION

This application is based on and claims priority under 35 USC 119 from Japanese Patent Application No. 2022-163569, filed on Oct. 11, 2022, the disclosure of which is incorporated by reference herein.

BACKGROUND

Technical Field

The present disclosure relates to a vehicle seat.

Related Art

A vehicle seat described in Japanese Patent No. 6916232 includes a reclining lever (reclining lever) that releases a lock of a reclining device (recliner) by being rotated, a reclining cover (hinge cover) provided on a side portion of a seat cushion inside a vehicle with respect to the reclining lever, a seat belt disposed at a position in contact with the reclining lever when an occupant wears the seat belt, a protrusion protruding from the reclining lever toward the inside of the vehicle, and a recess formed on a surface on the vehicle outer side of the hinge cover. When the vehicle collides, a load is input from the seat belt to the reclining lever, so that the protrusion of the reclining lever is engaged with the recess of the hinge cover, and the rotation of the reclining lever is restricted. This prevents the recliner from being unlocked unintentionally.

SUMMARY

In the above prior art, it is not considered that the lock of the recliner is released by the load input from the seat belt or the like to the hinge cover at the time of vehicle collision.

In view of the above fact, an object of the present disclosure is to provide a vehicle seat capable of preventing a recliner from being unlocked by a load input from a seat belt or the like to a hinge cover at the time of vehicle collision.

A vehicle seat according to a first aspect of the present disclosure includes: a hinge cover that is disposed at a side portion of a seat cushion and has an opening through which a shaft of a recliner provided between the seat cushion and a seat back passes; and a reclining lever that is disposed at an outer side in a seat width direction with respect to the hinge cover, is rotatable about the shaft to unlock the recliner, and has a protrusion protruding inward in the seat width direction, the protrusion facing an edge portion of the opening in a radial direction of the shaft.

According to the vehicle seat of the first aspect, the hinge cover disposed at the side portion of the seat cushion has the opening through which the shaft of the recliner provided between the seat cushion and the seat back passes. The reclining lever disposed at the outer side in the seat width direction with respect to the hinge cover is rotatable about the shaft of the recliner to unlock the recliner. The reclining lever has a protrusion protruding inward in the seat width direction, and the protrusion faces an edge portion of the opening of the hinge cover in the radial direction of the recliner shaft. For this reason, when a load is input to the hinge cover from the seat belt or the like at the time of vehicle collision and the hinge cover is displaced in the radial direction with respect to the recliner shaft, the edge portion of the opening comes into contact with the protrusion, so that the displacement of the hinge cover is limited. As a result, it is possible to prevent the recliner from being unintentionally unlocked by the displacement of the hinge cover.

In a vehicle seat according to a second aspect, in the first aspect, the protrusion and the edge portion face each other on their respective surfaces.

In the vehicle seat of the second aspect, the protrusion of the reclining lever and the edge portion of the opening of the hinge cover face each other on their respective surfaces. Therefore, when the hinge cover is displaced in the radial direction with respect to the shaft of the recliner, the edge portion of the opening and the protrusion come into surface contact with each other on their respective surfaces. This makes it possible to favorably limit the displacement of the hinge cover.

In a vehicle seat according to a third aspect, in the first aspect or the second aspect, the protrusion faces the edge portion at a plural facing portions arranged along a circle concentric with the shaft.

According to the vehicle seat of the third aspect, the protrusion of the reclining lever faces the edge portion of the opening of the hinge cover at the plural facing portions arranged along the circle concentric with the shaft of the recliner. Therefore, when the hinge cover is displaced in the radial direction with respect to the shaft of the recliner, the edge portion of the opening comes into contact with the protrusion at the plural facing portions. This makes it possible to favorably limit the displacement of the hinge cover.

In a vehicle seat according to a fourth aspect, in any one of the first to third aspects, the protrusion faces the edge portion from at least a seat lower side and a seat front side.

According to the vehicle seat of the fourth aspect, the protrusion of the reclining lever faces the edge portion of the opening of the hinge cover from at least the seat lower side and the seat front side. Therefore, when the hinge cover is displaced to the seat lower side and the seat front side with respect to the shaft of the recliner due to the load from the seat belt at the time of vehicle collision, the edge portion of the opening comes into contact with the protrusion. As a result, the displacement of the hinge cover due to the load from the seat belt can be favorably limited.

As described above, according to the vehicle seat according to the present disclosure, it is possible to prevent the recliner from being unlocked by the load input from the seat belt or the like to the hinge cover at the time of vehicle collision.

BRIEF DESCRIPTION OF THE DRAWINGS

Exemplary embodiments of the present invention will be described in detail based on the following figures, wherein.

DETAILED DESCRIPTION

Figure 1:
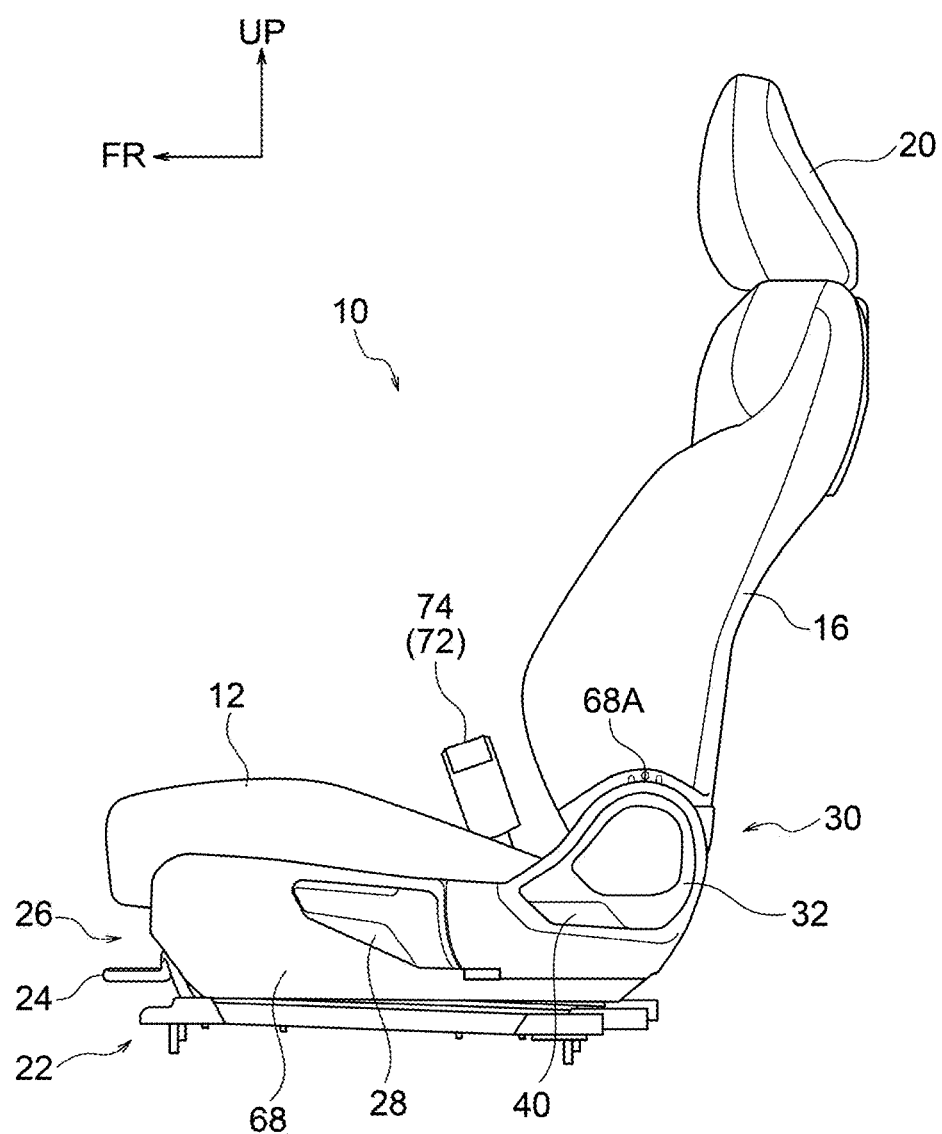
FIG. 1 is a side view illustrating a vehicle seat according to an embodiment.

Hereinafter, a vehicle seat 10 according to an embodiment of the present disclosure will be described with reference to FIGS. 1 to 6. Note that in each drawing, some reference numerals may be omitted in order to make the drawing easy to see. Arrows FR, LH, and UP appropriately described in the drawings indicate front, left, and upper sides of the vehicle seat 10, respectively. Hereinafter, when the description is simply made using the front-rear, left-right, and up-down directions, directions with respect to the vehicle seat 10 are indicated.

As illustrated in FIG. 1, a vehicle seat 10 according to the present embodiment includes a seat cushion 12 on which an occupant is seated, a seat back 16 that supports a back of the occupant, and a headrest 20 that supports a head of the occupant. The seat cushion 12 is connected to a floor (not illustrated) of a vehicle body via a known seat slide mechanism 22 and a lifter mechanism 26. The seat back 16 is connected to the seat cushion 12 via a known reclining mechanism 30. The front-rear, left-right, and up-down directions of the vehicle seat 10 coincide with the front-rear, left-right, and up-down directions of the vehicle. The vehicle seat 10 is a left front seat of the vehicle. When the vehicle seat 10 is a right front seat of the vehicle, the configuration is bilaterally symmetrical with that of the present embodiment.

An occupant seated on the seat cushion 12 of the vehicle seat 10 is restrained on the vehicle seat 10 by a known three-point seat belt device 72. The seat belt device 72 includes a buckle 74 disposed at a right side of the seat cushion 12. Although not illustrated, in the seat belt device 72, one longitudinal end portion of the seat belt is locked to a spool of a retractor provided at a lower end portion of a center pillar of the vehicle, and the other longitudinal end portion of the seat belt is locked to a floor of a vehicle body on the left side of the seat cushion 12. When the occupant seated on the seat cushion 12 couples a tongue plate provided at a longitudinal intermediate portion of the seat belt to the buckle 74, the occupant is in the state of wearing the seat belt.

A slide lever 24 for unlocking the seat slide mechanism 22 is provided on the lower side of the front portion of the seat cushion 12. A hinge cover 68, a lifter lever 28, and a reclining lever 32 are provided on a left side portion of the seat cushion 12. The hinge cover 68, the lifter lever 28, and the reclining lever 32 are manufactured by, fir example, resin injection molding. The hinge cover 68 has an elongated shape whose longitudinal direction is the front-rear direction and whose thickness direction is the left-right direction. The length of the hinge cover 68 in the front-rear direction is set to be equal to the length of the seat cushion 12 in the front-rear direction. The seat slide mechanism 22, the lifter mechanism 26, and the reclining mechanism 30 are covered with the hinge cover 68 from the left side.

The lifter lever 28 has an elongated shape whose longitudinal direction is the front-rear direction and whose thickness direction is the left-right direction, and is disposed at a front-rear center portion of the hinge cover 68. The rear end portion of the lifter lever 28 is connected to the lifter mechanism 26 on the right side (inner side in the seat width direction) of the hinge cover 68. A vertical position of the seat cushion 12 with respect to the floor of the vehicle body is adjusted by vertically rotating the lifter lever 28.

The reclining lever 32 has a substantially trapezoidal shape when viewed from the left-right direction and has a dish shape opened toward the right side (inner side in the seat width direction), and is disposed at the rear portion of the hinge cover 68. An upward extending portion 68A extending upward is provided in the rear portion of the hinge cover 68. The upward extending portion 68A covers the recliner 46 (see FIGS. 2 and 6) of the reclining mechanism 30 from the left side (the outer side in the seat width direction). A main body portion 48 of the recliner 46 has a disk shape whose axial direction is the left-right direction, and is disposed between the rear end portion of the cushion frame 14 configuring the skeleton of the seat cushion 12 and the lower end portion of the back frame 18 configuring the skeleton of the seat back 16.

A recliner shaft 50 whose axial direction is the left-right direction is provided in an axial center portion of the main body portion 48 of the recliner 46. The recliner shaft 50 corresponds to a "shaft" in the present disclosure. An unlocking plate 52 for unlocking the recliner 46 is attached to the recliner shaft 50.

Figure 2:
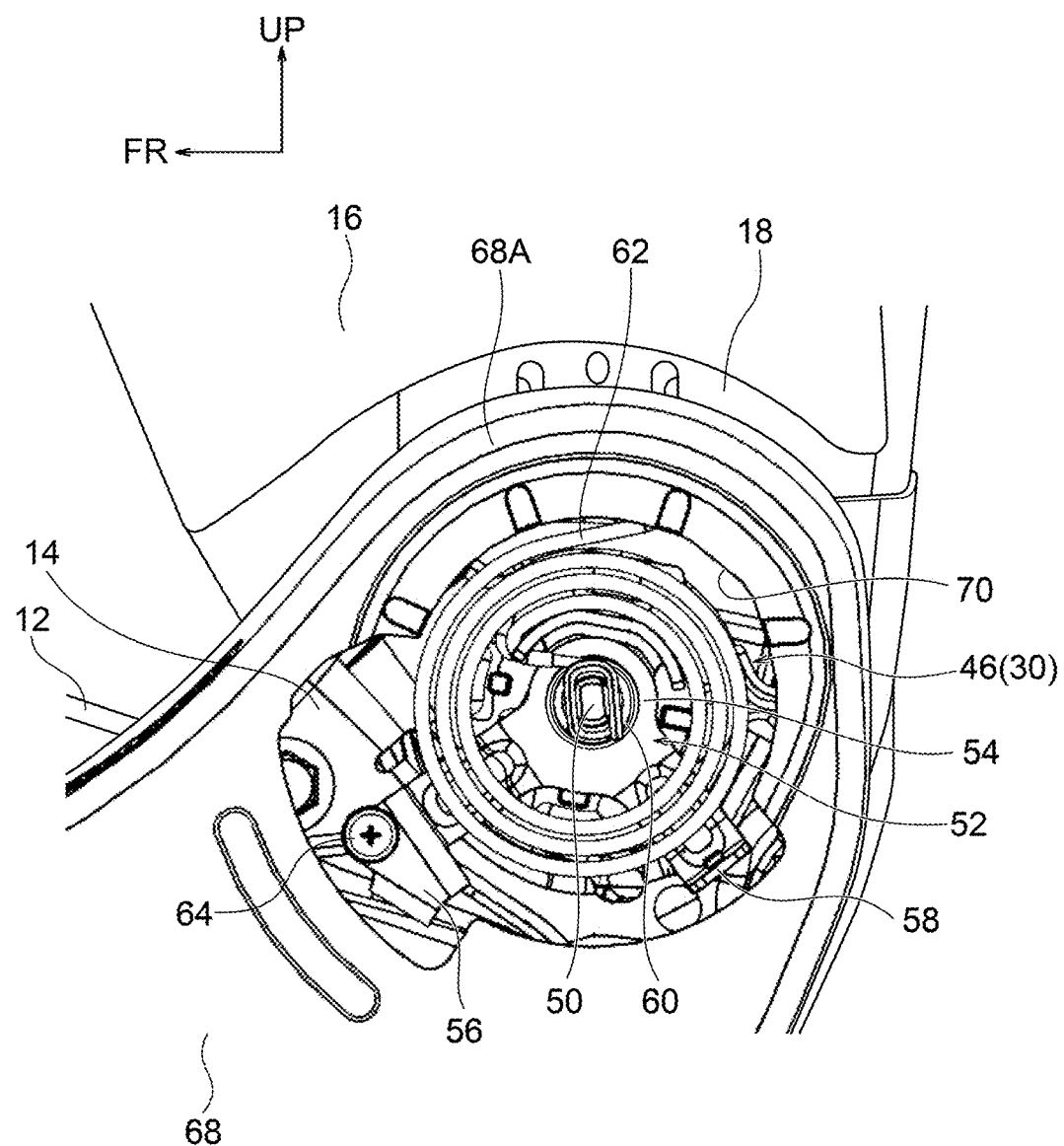
FIG. 2 is a side view illustrating a configuration around a recliner in the vehicle seat according to the embodiment.

The unlocking plate 52 is manufactured by, for example, press-molding a metal plate material, and has an L shape when viewed from the left-right direction as illustrated in FIG. 2. The unlocking plate 52 includes a shaft fixing portion 54 fixed to the recliner shaft 50, a forearm portion 56 extending in the front side and the lower side from the shaft fixing portion 54, and a rear arm portion 58 extending rearward and downward from the shaft fixing portion 54. The recliner shaft 50 passes the shaft fixing portion 54, and the shaft fixing portion 54 is fixed to the recliner shaft 50 by welding or the like.

When the unlocking plate 52 is rotated clockwise in FIG. 2 about the recliner shaft 50, the recliner 46 is unlocked, and a reclining angle of the seat back 16 with respect to the seat cushion 12 can be adjusted. The back frame 18 is biased in a rising direction with respect to the cushion frame 14 by a torsion spring 62 illustrated in FIG. 2.

An opening 70 through which the recliner shaft 50 passes is formed in the upward extending portion 68A of the hinge cover 68. The opening 70 is formed in a region facing the unlocking plate 52 and the torsion spring 62 in the left-right direction. An upper edge portion of the opening 70 is formed in a substantially arc shape concentric with the recliner shaft 50. A reclining lever 32 is disposed at the left side (outer side in the seat width direction) of the upward extending portion 68A, and the opening 70 is covered with the reclining lever 32.

Figure 3:
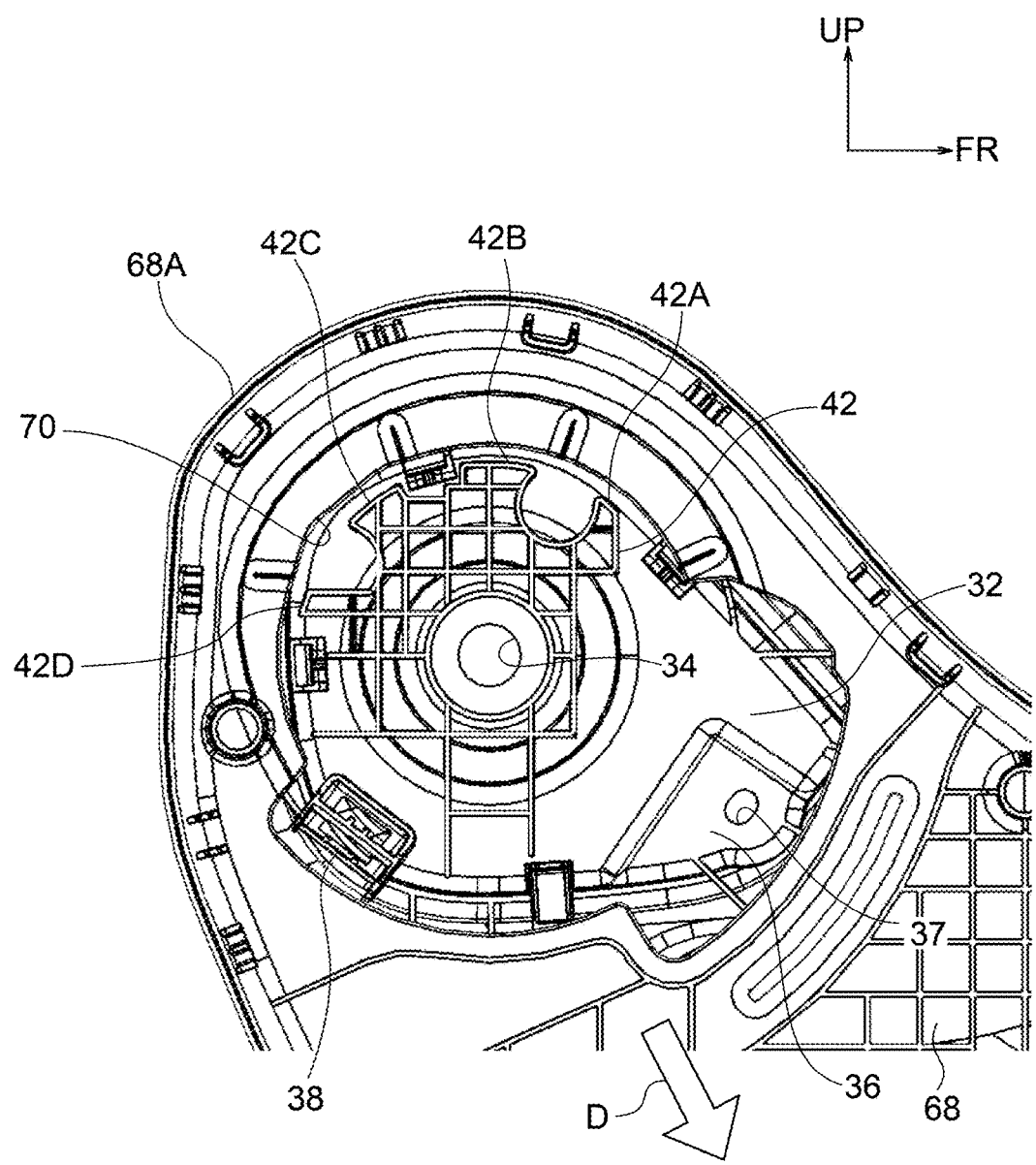
FIG. 3 is a side view illustrating a part of a hinge cover and a reclining lever included in the vehicle seat according to the embodiment as viewed from an inner side in a seat width direction.
Figure 4:
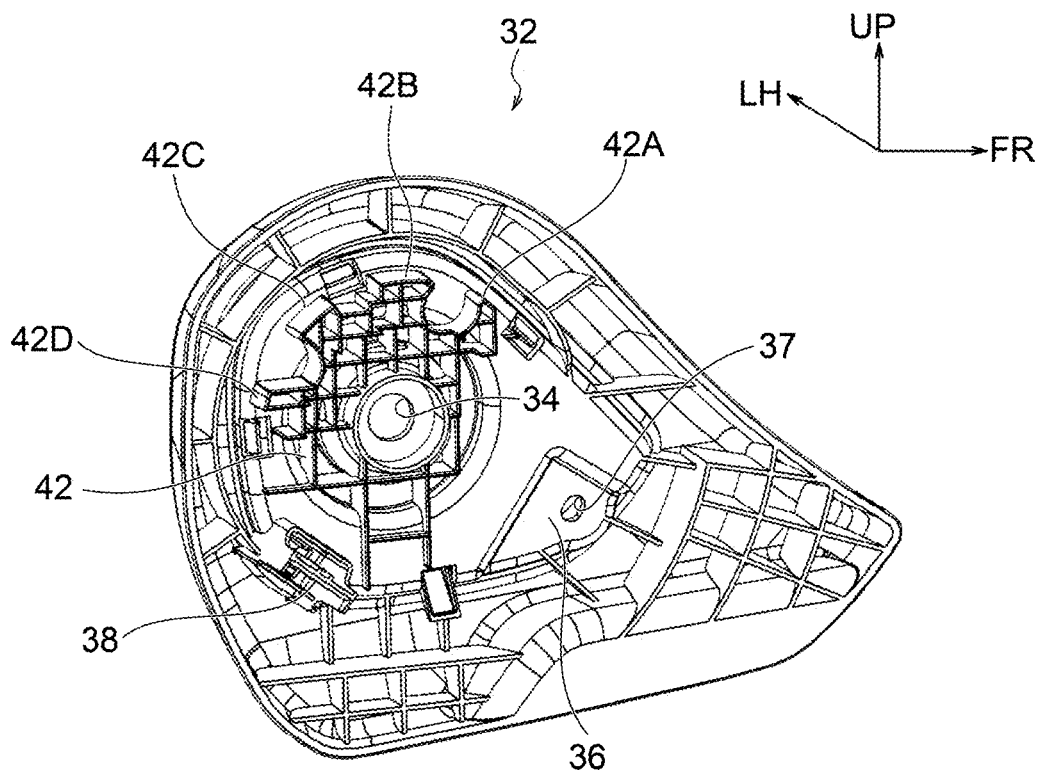
FIG. 4 is a first perspective view illustrating a reclining lever.
Figure 5:
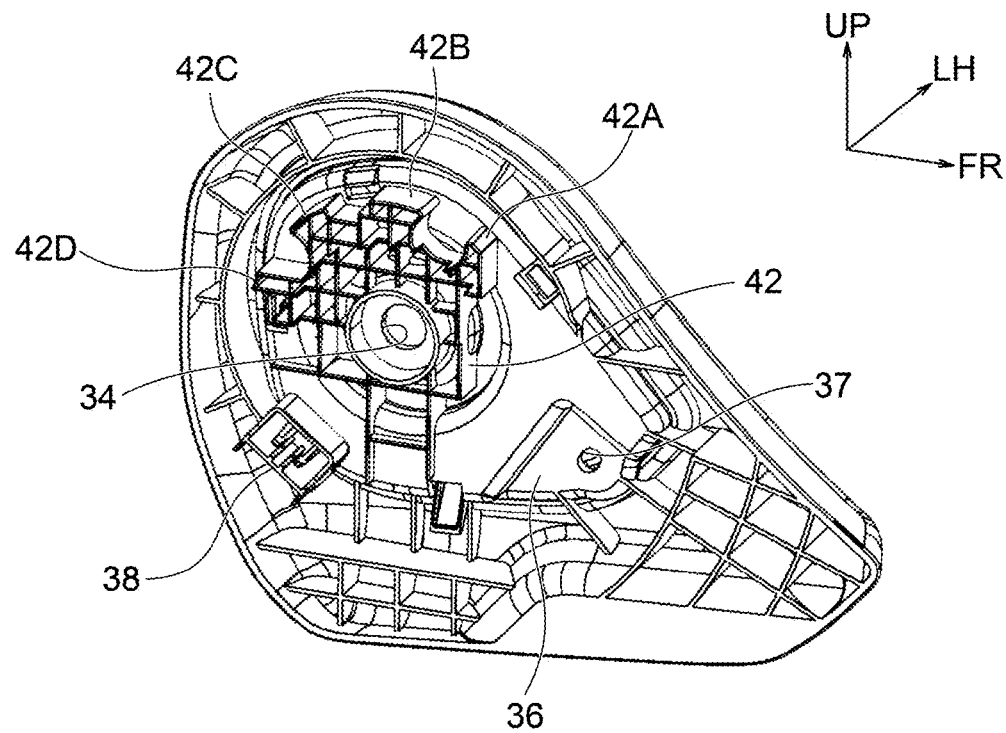
FIG. 5 is a second perspective view illustrating the reclining lever.
Figure 6:
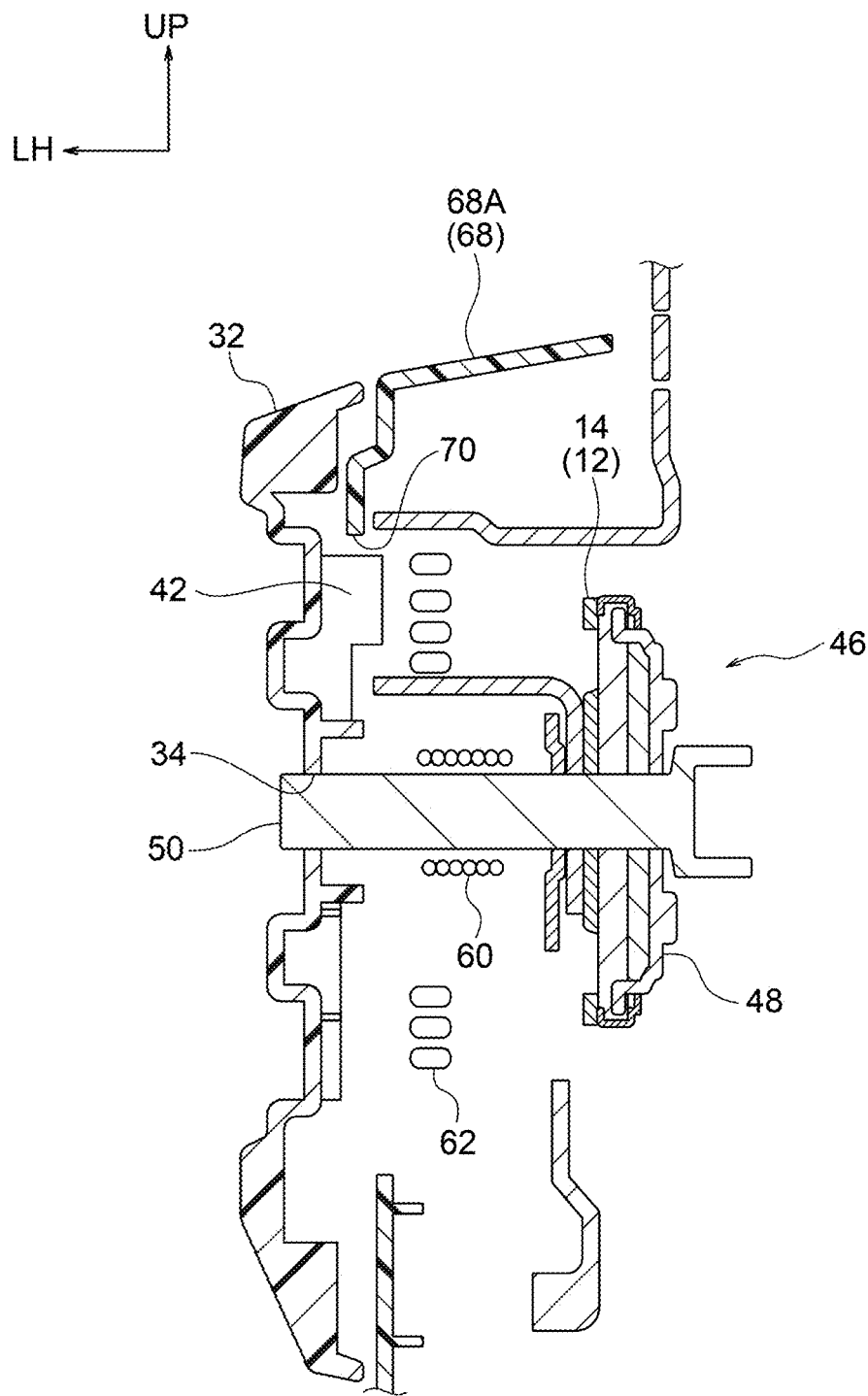
FIG. 6 is a cross-sectional view illustrating a configuration around a recliner in the vehicle seat according to the embodiment.

As illustrated in FIGS. 3 to 5, a through-hole 34 is formed in a center portion of the reclining lever 32. A distal end portion of the recliner shaft 50 is inserted into the through-hole 34. An arm fixing portion 36 to which the distal end portion of the forearm portion 56 of the unlocking plate 52 is fixed by screwing is provided on the front side of the reclining lever 32 on the lower side of the through-hole 34. A screw hole 37 through which a screw 64 is inserted is formed in the arm fixing portion 36. A fitting portion 38 in which the distal end portion of the rear arm portion 58 of the unlocking plate 52 is fitted is provided on the rear side of the reclining lever 32 on the lower side of the through-hole 34. The distal end portion of the rear arm portion 58 is bent toward the left side (the outer side in the seat width direction) and is fitted to the fitting portion 38 from the right side (the inner side in the seat width direction). The reclining lever 32 is integrated with the recliner 46, and is not movable relative to the cushion frame 14 of the seat cushion 12 in the radial direction of the recliner shaft 50.

As illustrated in FIG. 1, a recess 40 recessed to the right side (the inner side in the seat width direction) is formed at the lower end portion of the front portion of the reclining lever 32. When the occupant seated on the seat cushion 12 hooks the left hand finger into the recess 40 and lifts the reclining lever 32 upward, the reclining lever 32 rotates about the recliner shaft 50 integrally with the unlocking plate 52. As a result, the recliner 46 is unlocked. When the occupant stops the lifting operation, the recliner shaft 50, the unlocking plate 52, and the reclining lever 32 return to the original positions by the biasing force of a torsion coil spring 60 illustrated in FIG. 2, and the recliner 46 is locked again.

A protrusion 42 protruding rightward (inward in the seat width direction) is formed around the through-hole 34 in the reclining lever 32. The protrusion 42 is configured by a plural ribs having a substantially lattice shape when viewed from the left-right direction. The protrusion 42 is inserted inside the opening 70 of the hinge cover 68. The protrusion 42 faces the edge portion of the opening 70 in the radial direction of the recliner shaft 50.

On the upper side of the protrusion 42, a plural (here, four) facing portions 42A, 42B, 42C, and 42D arranged along a circle (virtual circle) concentric with the recliner shaft 50 are provided. Each of the facing portions 42A, 42B, 42C, and 42D has a curved plate shape curved along the above circle. In each of the facing portions 42A, 42B, 42C, and 42D, the radially outer surface of the recliner shaft 50 has a curved surface shape concentric with the inner peripheral surface of the edge portion of the opening 70. Each of the facing portions 42A, 42B, 42C, and 42D and the edge portion of the opening 70 face each other on their respective surfaces. When the recliner 46 is in a locked state, the rearmost facing portion 421) among the facing portions 42A, 42B, 42C, and 42D faces the edge portion (rear edge portion) of the opening 70 from the front side in proximity, and the remaining three facing portions 42A, 42B, and 42C face the upper edge portion of the opening 70 from the lower side in proximity. Gaps between each of the facing portions 42A, 42B. 42C, and 42D and the edge portion of the opening 70 are all set to about several millimeters.

Next, actions and effects of the present embodiment will be described.

According to the vehicle seat 10 having the above configuration, the hinge cover 68 disposed at the side portion of the seat cushion 12 has the opening 70 through which the recliner shaft 50 of the recliner 46 provided between the seat cushion 12 and the seat back 16 passes. The reclining lever 32 disposed at the outer side in the seat width direction with respect to the hinge cover 68 is rotatable about the recliner shaft 50 to unlock the recliner 46. The reclining lever 32 has a protrusion 42 protruding inward in the seat width direction, and the protrusion 42 faces the edge portion of the opening 70 of the hinge cover 68 in the radial direction of the recliner shaft 50.

Therefore, when the seat belt or the like comes into contact with the hinge cover 68 at the time of vehicle collision, a load is input to the hinge cover 68, and the hinge cover 68 tries to be displaced in the radial direction with respect to the recliner shaft 50, the edge portion of the opening 70 of the hinge cover 68 comes into contact with the protrusion 42 of the reclining lever 32. Since the reclining lever 32 is not movable relative to the cushion frame 14 of the seat cushion 12 in the radial direction of the recliner shaft 50, the displacement of the hinge cover 68 is limited by the contact. As a result, it is possible to prevent the recliner 46 from being unintentionally unlocked by the displacement of the hinge cover 68. That is, when the displacement of the hinge cover 68 is not limited, the hinge cover 68 may come into contact with the forearm portion 56 or the rear arm portion 58 of the unlocking plate 52, and the unlocking plate 52 may rotate in an unlocking direction of the recliner 46. In this case, the recliner 46 is unlocked at a timing that is not in accordance with the intention of the occupant, but this can be avoided in the present embodiment.

In the present embodiment, the protrusion 42 of the reclining lever 32 and the edge portion of the opening 70 of the hinge cover 68 face each other on their respective surfaces. Therefore, when the hinge cover 68 is displaced in the radial direction with respect to the shall 50 of the recliner 46, the edge portion of the opening 70 of the hinge cover 68 and the protrusion 42 of the reclining lever 32 come into surface contact with each other on their respective surfaces. This makes it possible to favorably limit the displacement of the hinge cover 68.

In the present embodiment, the protrusion 42 of the reclining lever 32 faces the edge portion of the opening 70 of the hinge cover 68 at the plural facing portions 42A, 42B, 42C, and 42D arranged alone a circle concentric with the recliner shaft 50. Therefore, when the hinge cover 68 is displaced in the radial direction with respect to the recliner shaft 50, the edge portion of the opening 70 of the hinge cover 68 comes into contact with the protrusion 42 of reclining lever 32 at the plural facing portions 42A, 42B, 42C, and 42D. This makes it possible to more favorably limit the displacement of the hinge cover 68.

Furthermore, in the present embodiment, the protrusion 42 of the reclining lever 32 faces the edge portion of the opening 70 of the hinge cover 68 from the lower side and the front side. Therefore, when the hinge cover 68 is displaced to the lower side and the front side with respect to the recliner shaft 50 by the load from the seat belt at the time of vehicle collision (see an arrow D in FIG. 3), the edge portion of the opening 70 of the hinge cover 68 comes into contact with the protrusion 42 of the reclining lever 32. As a result, the displacement of the hinge cover 68 due to the load from the seat belt can be favorably limited.

In the above embodiment, the protrusion 42 of the reclining lever 32 faces the edge portion of the opening 70 of the hinge cover 68 from the lower side and the front side, but the present disclosure is not limited thereto. For example, the protrusion may face the edge portion of the opening from the rear side or the upper side.

In the above embodiment, the protrusion 42 faces the edge portion of the opening 70 at the plural facing portions 42A, 42B, 42C, and 42D arranged along a circle concentric with the recliner shaft 50. However, the present disclosure is not limited to this configuration. For example, the protrusion may be configured to face the edge portion of the opening in a single facing portion extending along a circle concentric with the recliner shaft 50.

In the above embodiment, the protrusion 42 and the edge portion of the opening 70 face each other on their respective surfaces, hut the present disclosure is not limited thereto. For example, the protrusion and the edge portion of the opening may face each other with a plural lines or points.

In addition, the present disclosure can be variously modified without departing from the gist thereof. It is a matter of course that the scope of rights of the present disclosure is not limited to the above embodiments,

What is claimed is:

1. A vehicle seat, comprising:
a hinge cover that is disposed at a side portion of a seat cushion and has an opening through which a shaft of a recliner provided between the seat cushion and a seat back passes; and
a reclining lever that is disposed at an outer side in a seat width direction with respect to the hinge cover, is rotatable about the shaft to unlock the recliner, and has a protrusion protruding inward in the seat width direction, the protrusion facing an edge portion of the opening in a radial direction of the shaft,
wherein the hinge cover is configured such that if displaced during an event where the hinge cover experiences a load, the edge portion of the opening comes into contact with the protrusion to limit displacement of the hinge cover and/or the reclining lever.

2. The vehicle seat according to claim 1, wherein a surface of the protrusion facing outward in the radial direction of the shaft and a surface of the edge portion of the opening facing inward in the radial direction of the shaft face each other.

3. The vehicle seat according to claim 1, wherein the protrusion faces the edge portion at a plurality of facing portions arranged along a circle concentric with the shaft.

4. The vehicle seat according to claim 1, wherein the protrusion faces the edge portion from at least a seat lower side and a seat front side.

* * * * *